(12) United States Patent
Bargagni et al.

(10) Patent No.: US 10,334,300 B2
(45) Date of Patent: Jun. 25, 2019

(54) SYSTEMS AND METHODS TO PRESENT CONTENT

(71) Applicant: Cynny Spa, Florence (IT)

(72) Inventors: Stefano Bargagni, Constanta (RO); Roberto Marras, Sassari (IT)

(73) Assignee: CYNNY SPA, Florence (IT)

( * ) Notice: Subject to any disclaimer, the term of this patent is extended or adjusted under 35 U.S.C. 154(b) by 0 days.

(21) Appl. No.: 14/850,770

(22) Filed: Sep. 10, 2015

(65) Prior Publication Data

US 2016/0165284 A1 Jun. 9, 2016

Related U.S. Application Data

(63) Continuation of application No. 14/707,416, filed on May 8, 2015, now Pat. No. 9,524,278.

(Continued)

(51) Int. Cl.
*H04N 21/422* (2011.01)
*H04N 21/2187* (2011.01)
*H04N 21/61* (2011.01)
*H04N 21/258* (2011.01)
*H04N 21/414* (2011.01)

(Continued)

(52) U.S. Cl.
CPC ..... *H04N 21/2668* (2013.01); *H04N 21/2187* (2013.01); *H04N 21/25891* (2013.01); *H04N 21/41407* (2013.01); *H04N 21/42201* (2013.01); *H04N 21/42202* (2013.01); *H04N 21/4312* (2013.01); *H04N 21/4661* (2013.01); *H04N 21/4782* (2013.01); *H04N 21/47205* (2013.01);

(Continued)

(58) Field of Classification Search
None
See application file for complete search history.

(56) References Cited

U.S. PATENT DOCUMENTS 5,910,987 A * 6/1999 Ginter ............... G06F 21/10
348/E5.006
6,904,408 B1 6/2005 McCarthy et al.
(Continued)

FOREIGN PATENT DOCUMENTS

WO 2014145665 A2 9/2014

OTHER PUBLICATIONS

International Patent Application PCT/US2015/052415, International Search Report and Written Opinion, dated Dec. 17, 2015.

(Continued)

*Primary Examiner* — Fernando Alcon

(74) *Attorney, Agent, or Firm* — Hickman Palermo Becker Bingham LLP

(57) ABSTRACT

A content presentation system in which a set of content items, which may include static stored content documents and/or live content streaming from computing devices, is provided by a web channel engine to a web channel. A rules engine (e.g., of a web channel server or a web channel presenter) is configured to sequentially present some of the contents to a user in a video form in an automated way, based on real-time sensor data of user devices and/or interactions of the users with the web channel, including users who are provided with permissions to edit the content, look and feel of the web channel, and users who watch the web channel without editing privileges.

25 Claims, 6 Drawing Sheets

Related U.S. Application Data

(60) Provisional application No. 62/087,487, filed on Dec. 4, 2014.

(51) Int. Cl.
  *H04N 21/466* (2011.01)
  *H04N 21/431* (2011.01)
  *H04N 21/472* (2011.01)
  *H04N 21/643* (2011.01)
  *H04N 21/2668* (2011.01)
  *H04N 21/4782* (2011.01)

(52) U.S. Cl.
  CPC ..... *H04N 21/6125* (2013.01); *H04N 21/6175* (2013.01); *H04N 21/64322* (2013.01)

(56) References Cited

U.S. PATENT DOCUMENTS

| | | | |
|---|---|---|---|
| 8,200,669 | B1 | 6/2012 | Iampietro |
| 8,659,703 | B1* | 2/2014 | Candelore ............... G08C 17/02 340/686.6 |
| 9,264,770 | B2* | 2/2016 | Jensen ............... H04N 21/44218 |
| 2002/0078441 | A1* | 6/2002 | Drake ................. H04N 7/17318 725/9 |
| 2003/0061183 | A1* | 3/2003 | Schaffer ................. H04N 7/163 706/8 |
| 2003/0093791 | A1* | 5/2003 | Julia .................. H04N 7/17318 725/40 |
| 2006/0248122 | A1 | 11/2006 | Nikiel |
| 2008/0046930 | A1* | 2/2008 | Smith .................... H04N 7/163 725/46 |
| 2008/0109556 | A1* | 5/2008 | Karlberg ................ H04N 7/163 709/231 |
| 2008/0114767 | A1 | 5/2008 | Garbow |
| 2008/0301746 | A1* | 12/2008 | Wiser ................. H04N 7/17318 725/114 |
| 2009/0048908 | A1* | 2/2009 | Kaplan .................. G06Q 30/02 705/7.33 |
| 2009/0271821 | A1* | 10/2009 | Zalewski ................ A63F 13/12 725/37 |
| 2009/0300673 | A1* | 12/2009 | Bachet ............... H04N 7/17318 725/31 |
| 2010/0180218 | A1 | 7/2010 | Boston |
| 2011/0072264 | A1 | 3/2011 | McNulty |
| 2011/0188415 | A1* | 8/2011 | Graziano ............... G06Q 30/02 370/310 |
| 2011/0246908 | A1* | 10/2011 | Akram ........... H04N 21/234318 715/752 |
| 2012/0135684 | A1* | 5/2012 | Shrum, Jr. ....... H04N 21/25808 455/41.2 |
| 2012/0163770 | A1* | 6/2012 | Kaiser ............. H04N 21/44016 386/241 |
| 2012/0304247 | A1 | 11/2012 | Badger et al. |
| 2013/0046825 | A1* | 2/2013 | Anstandig ........ H04N 21/26258 709/204 |
| 2013/0086112 | A1 | 4/2013 | Everingham et al. |
| 2013/0094830 | A1* | 4/2013 | Stone .................... H04N 5/775 386/230 |
| 2013/0219417 | A1* | 8/2013 | Gilson ................. H04N 21/258 725/12 |
| 2013/0288212 | A1 | 10/2013 | Bist |
| 2014/0068074 | A1 | 3/2014 | Goyal et al. |
| 2014/0078039 | A1* | 3/2014 | Woods ............... H04N 21/4223 345/156 |
| 2015/0067708 | A1* | 3/2015 | Jensen ............... H04N 21/4756 725/10 |
| 2015/0264432 | A1* | 9/2015 | Cheng ............. H04N 21/44218 725/10 |

OTHER PUBLICATIONS

Lum et al. A context-aware decision engine for content adaptation. IEEE Pervasive Computing, 2002, v.1 n. 3, p. 41-49, retrieved on Oct. 11, 2015 from http://hub.hku.hk/bitstream/10722/47096/1/74875.pdf?accept=1.

Schaik et al. The effects of frame layout and differential background contrast on visual search performance in web pages, Interacting with Computers vol. 13, Issue 5, May 2001, pp. 513-525, retrieved on Oct. 11, 2015 from http://www.researchgate.net/profile/Paul_Schaik/publication/220055205_The_effects_of_frame_layout_differential_background_contrast_on_visual_search_perfomance_in_Web_pages/links/0912f51027c9d99f5a000000.pdf.

The International Bureau of WIPO, "International Preliminary Report" in application on. PCT/US2015/052415, dated Jun. 20, 2017, 8 pages.

International Bureau, "Preliminary Repoty on Patentability" in application No. PCT/US2015/052413, dated Apr. 25, 2017, 8 pages.

Current Claims in application No. PCT/US2015/052415, dated Jun. 2017, 4 pages.

Current Claims in application No. PCT/US2015/052413, dated Apr. 2017, 4 pages.

European Patent Office, "Search Report" in application No. 15848329.7-1218, dated Jun. 6, 2018, 9 pages.

European Claims in application No. 15848329.7-1218, dated Jun. 2018, 3 pages.

Bloehdorn et al., "TagFS-Tag Semantics for Hierarchical File Systems", dated May 1, 2006, 6 pages.

Bargagni, U.S. Appl. No. 14/691,335, filed Apr. 20, 2015, Final Office Action, dated Dec. 28, 2017.

European Patent Office, "Search Report" in application No. 15 864 642.2-1208, dated Jan. 10, 2019, 4 pages.

European Claims in application No. 15 864 642.2-1208, dated Jan. 2019, 3 pages.

* cited by examiner

SYSTEMS AND METHODS TO PRESENT CONTENT

RELATED APPLICATIONS

This application is a continuation application of U.S. patent application Ser. No. 14/707,416, filed May 8, 2015, entitled "Systems and Methods to Present Content," which claims priority to U.S. Prov. Pat. App. Ser. No. 62/087,487, filed Dec. 4, 2014, entitled "Systems and Methods to Present Content," by Stefano Bargagni et al., the entire contents of which applications are incorporated by references as if fully set forth herein.

BACKGROUND

FIG. 2 shows a traditional approach to present content, in which editors publish content. The content reaches the audience via a communication channel. The audience is monitored by a system, such as Google Analytics, to obtain statistics about user interaction with the content. Editors may adjust the content stream in view of the statistics.

A traditional content management system permits editors in charge to organize the content (e.g., the YouTube or Picasa services), or, as an alternative, defines a common, standard way to present it (e.g., the Twitter or Facebook services). Once the content is distributed through a channel, it can only be changed by editors. These editors generally consider audience rankings (e.g., a "liking" metric) deduced by audience monitoring tools (e.g., Google Analytics, Nielsen Rating, etc.).

SUMMARY OF THE DESCRIPTION

Systems and methods to select content for presentation to one or more users (e.g., based on interaction data collected from users while viewing and/or editing the content) are described herein. Some embodiments are summarized in this section.

In one embodiment, a method implemented in a data processing system includes: collecting, over a network, by a web server, interaction data from a plurality of computing devices of a plurality of users accessing a web location (e.g., supported by the web server), the interaction data comprising sensor data from the plurality of computing devices, and data regarding interactions of the users with user interfaces configured to present content (e.g., accessed from the web server or the web location); and sending, over the network, by the web server, for real-time presentation in the user interfaces, content components in a sequence determined based on applying a set of rules to the interaction data.

In another embodiment, a method includes: communicating, over a network, by the computing device, with a web location to receive content; receiving, by the computing device, content components from the web location; and presenting, by a web channel presenter, in a user interface on the computing device, the content components in a manner determined by applying a set of rules to interaction data, the interaction data comprising data regarding real-time interaction of the user with the user interface while viewing content from the web location, and the interaction data further comprising data regarding interactions of other users while receiving content from the web location.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
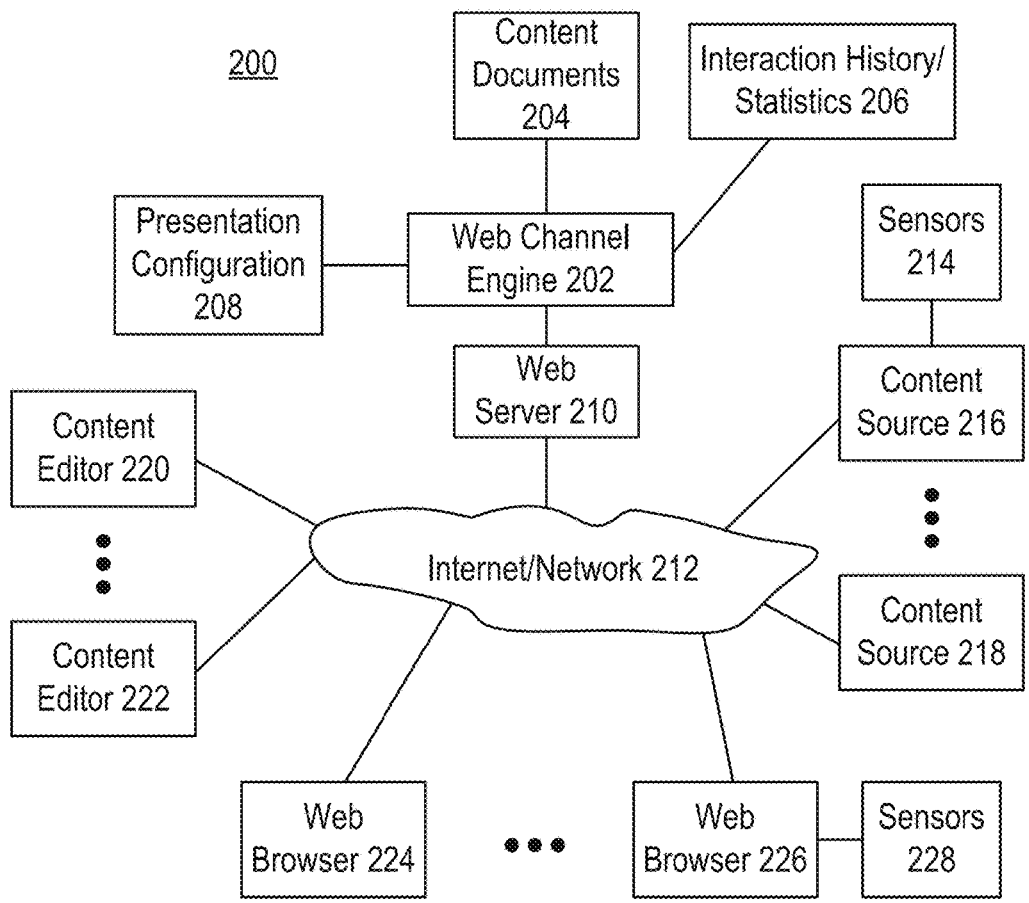
FIG. 1 shows a system configured to present live content via a web channel according to one embodiment.
Figure 2:
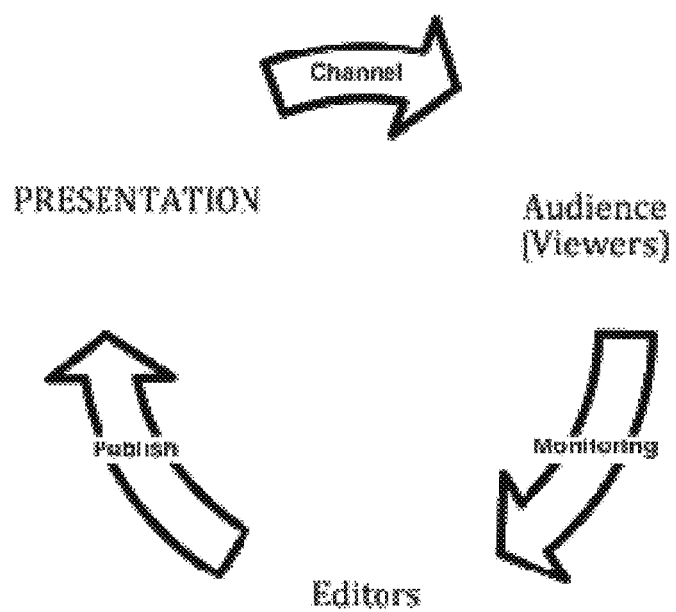
FIG. 2 shows a traditional approach to present content.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In one embodiment, editors are users having access to a web channel engine, which is discussed in detail below, that controls content presented in a web channel. The editors control the selection of content that is published on the web channel.

One embodiment of the presentation disclosure provides a new web channel, provided using a web channel engine as described herein. The web channel is dynamically built by the web channel engine in order to present digital contents to viewers. For example, the web channel is accessible by a viewer using a web browser/smart TV/HDMI-pen or a dedicated device. Digital content provided by the web channel engine is presented to users in the form of a succession of uploaded content (e.g., to provide content in a form like a video), and/or a web-page layout.

In one embodiment, the web channel content is not in the form of a traditional web page as defined by an HTML document. Rather, the web channel can be presented in a web browser in a way similar to a TV channel as presented in a frame shown to a viewer in the web browser.

In one embodiment, the web channel is at least implemented in part via client-side technologies to include a self-organized content provider. The web channel can be updated by its editors and the content on the web channel immediately changes in real-time and the web channel engine adapts its content based on inputs and interactions from both audience viewers and editors.

In one embodiment, the web channel engine automatically reacts and adapts the content provided to the audience based on feedback from the audience and/or mood. The mood may be determined by data from physiological sensors and/or from sensors that detect activities or motion of a computing device (e.g., a computing tablet or mobile phone device).

In one embodiment, the web channel includes automatic production of streaming content at the client side (e.g., on a user's mobile device). The content provided may be retrieved from contents stored in online servers (e.g., a cloud network).

In one embodiment, the web channel engine configures content to have a live component. Digital content provided in the web channel can be modified, added, and/or deleted by a specific set of users (editors) through a backend-GUI (graphical user interface) system. This GUI system, when in a mobile and/or web form, allows the editors to manage content in real-time so that the viewers experience the web channel in real-time (e.g., live broadcasting).

In one embodiment, an editor is first authenticated by a computing system. After the editor is authenticated, the editor can perform modifications using the web channel engine (e.g., modify a document to be published by the web channel). The editor can work alone or in cooperation with other editors accessing the web channel engine in order to create/modify content being provided or distributed over the web channel. The web channel provides a new way to present content to viewers.

In one embodiment, a user can authenticate into the backend-GUI system (e.g., in order to access the web channel engine) by an authentication/login API of a social network (e.g., Facebook, Google-F, etc.). The backend-GUI allows authenticated users to: authenticate; create/delete content using the web channel engine; publish/un-publish content for the web channel; upload/modify/delete contents for publication over the web channel using the web channel engine; and/or up-streaming content by a video device of the authenticated user (e.g., via a user's smartphone, Google glasses, etc.). The backend-GUI can be implemented as a mobile application or a web application.

Figure 3:
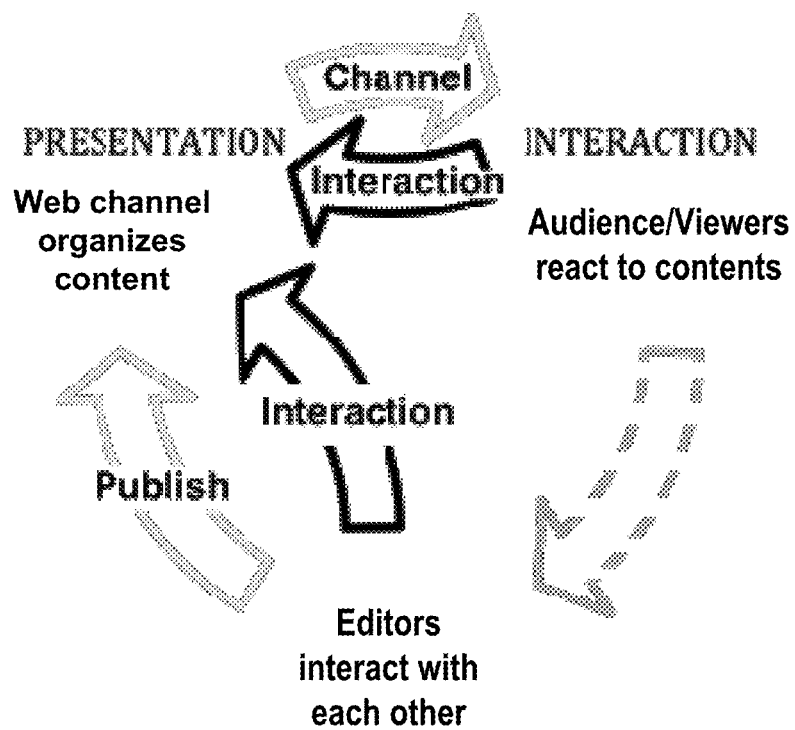
FIG. 3 shows an approach to present content according to one embodiment. A web channel provides content for presentation to an audience of viewers. The content is varied based on interactions with the viewers, and also interactions with editors that control content entering the web channel. The interactions may be measured or determined by, for example, online feedback provided from the viewers and/or the editors. These interactions may be represented by data from sensors or collection of other data or events from a computing device used by the viewer or editor when she is viewing or otherwise using or interacting with the web channel using the computing device. In one example, content provided by the web channel is automatically adjusted in response to the reactions of viewers to the content (e.g., as detected by physiological data obtained from the viewer via a sensor or monitor; one example is the heart-rate of the viewer).

FIG. 3 shows an approach to present content over a web channel according to one embodiment. The web channel engine provides content items for the web channel based on interactions of viewers and/or editors with the web channel (e.g., by feedback entered by the user into her mobile device sent to the web channel engine over the Internet, and/or collection of data from sensors at the user's computing device). The presentation of the content of the web channel engine is automatically adapted to the reactions of the viewers.

In one embodiment, the web channel engine provides content over the web channel to the audience (viewers) using traditional content delivery mechanisms and systems, but the web channel content is modified in real-time, on the basis of the interaction with viewers/editors as discussed above, and optionally as further based on data inputs from yet other persons (e.g., third party populations or the world in general). Traditional metrics for audience viewing may also be used as part of the foregoing data input to affect real-time modification of the content for the web channel.

In one embodiment, the interactions of the viewers with the content of the web channel are not only used to customize the presentation of the content for the respective viewers who perform the interactions, but also used for the automatic adjustment of content presented to other viewers. Thus, the interactions with the web channel of a first set of viewers (e.g., via data sent to the web channel engine) can result in real-time modification of content presentation over the same web channel, but that is accessed by a second set of viewers who did not perform or provide, and whose computing device were not associated with, the interaction input.

FIG. 1 shows a system 200 configured to present real-time content to user devices according to one embodiment. In FIG. 1, a web channel engine 202 is configured to be accessible by user devices by communicating over the Internet or network 212 via, for example, a web server 224, 226 (e.g., at a specific URL). Network 212 may be, for example, a LAN or WAN. Data regarding interactions of users such as viewers, editors, or even computing devices providing content sources are stored as interaction history/statistics 206 in a database. A web server 210 may provide user devices with access to the web channel, for example, at the specific URL. In some embodiments, different content documents may be hosted on different web servers (and/or different web domains).

The web channel engine 202 controls delivery of a set of content documents and/or real-time content streaming from content sources 216-218 and/or other web contents over a web channel delivered for viewing by users of web browsers 224-226. For example, a live content source 216 may include sensors 214 to capture the real-time location of live content (e.g., video and/or audio captured via mobile devices, camera, text input, which act as content source 216) uploaded from computing devices for broadcast to web browsers 224-226, the viewing angle of the computing devices of content source 216, the mood of the users operating the computing devices of content source 216 (e.g., as determined by physiological data obtained for the user from one or more sensors 214), etc.

A set of content editors 220-222 may operate on a presentation configuration 208 stored by the web channel engine 202 for guiding content selection, assembly, modification, and/or delivery over the web channel. The presentation configuration 208 may be based in part on editor input as was discussed above. The editor input may include recommendations, such as suggestions for prioritization of the presentation of the contents on the web channel. In one example, these suggestions may be directed to configuration of static content documents associated with the web channel (e.g., documents stored in content documents 204 in a data repository) via the stored presentation configuration 208, and/or configuration of the real-time content from the content sources 216-218 identified via the presentation configuration 208.

Each computing device running a web browser 224-226 may incorporate sensors to collect data for sending to web channel engine 202 for use in configuring content to deliver over the web channel. For example, web browser 226 includes sensors 228 (e.g., a physiological or health sensor to collect data on a user of the computing device running web browser 226, or a motion sensor of the computing device).

In FIG. 1, the web channel engine 202 is configured to track the interactions of the users who use web browsers 224-226 to view the web channel and the users who use the content editors 220-222 to edit, configure and prioritize presentation of the contents delivery over the web channel by the web channel engine 202. The interaction statistics 206 is stored for use by the web channel engine 202 in the optimization and customization of the presentation of the content associated with the web channel.

In one embodiment, the providing of content over the web channel can be set to expire based on one or more conditions (e.g., expiration to not be available to viewers after a prefixed date).

Once content for the web channel has been created as guided by the web channel engine 202, the content can be published to viewers. As soon as the web channel is published it is immediately accessible by web users (viewers).

In one embodiment, the web channel content can be accessed at a specific URL (or set of URLs) to the web users. For example, for accessing the content of the web channel, a user may enter this specific URL in a user interface of web browser 226, or may follow a link that points to this URL. In one embodiment, as soon as content of the web channel is directed or set to be un-published, its content is no long reachable by any channel (e.g., web server 210 does not answer requests made to the specific associated URL).

In one embodiment, on a real-time basis, once new content is uploaded or up-streamed by the web channel engine 202, the new content is available to the channel viewers (e.g., the world wide web users) on any user computing device containing a web browser 224 that can present the web channel. In one embodiment, streamed content will still be available to viewers (e.g., as uploaded content stored in a repository accessible by web channel engine 202) once the real-time streaming has completed.

In one embodiment, the web channel can be implemented by using Ajax techniques to real-time update the Document Object Model (DOM) of a web page to present newly uploaded/streamed content.

In some embodiments, the web channel engine 202 permits several content editors 220-222 to up-stream live contents concurrently from their computing devices, at the same time that an audience of viewers chooses which source to watch (e.g., by a viewer clicking on a dedicated thumbnail on her device). In some embodiments, the web channel engine 202 allows several editors to up-stream live contents concurrently from their devices, while other editors choose which source to send live over the web channel (e.g., by clicking on dedicated thumbnails in their respective GUI (director's panel)).

In one embodiment, the web channel engine 202 self-optimizes (responsive to viewers and/or editors) the rendering and the layout of content for the web channel, in order to improve the user experience, for example, depending on the device shape and power on which the browser is running. The web channel engine 202 self-optimizes the rendering and layout of the content in order to improve user experience. In one embodiment, by the specific, dedicated algorithm discussed further below, the web channel engine 202 interprets the meaning of contents that will be provided to the viewers over the web channel.

In one embodiment, photos, text, descriptions, titles, etc. will be rendered for a period of time as a single element, or in a set of a limited number of elements. For example, the pictures will be enlarged, repositioned and resized, filtered or modified, while other content (e.g., audio files) will be played in the background. This visual effect may be interleaved by moving previews of videos that are presented in the web channel. This rendering also may synchronize events and computing effects based on the background music, when audio files are present in the web channel.

In one embodiment, a text file presented in the web channel will be displayed using fade-in, fade-out effects, or other techniques like overlaying, etc. The specific techniques to use are determined on a basis of elements properties associated with the text file. For example, if a text file contains several rows, the text can be displayed as a whole unit for the viewer, or as a running line of text.

In other embodiments, the web channel will contain various types of files (e.g., Excel, Word, AutoCAD, Google Earth KML, Google Maps format, etc.). The web channel is configured to create a channel clip on a client side, in order to attract the interest of viewers. It should be noted that the above examples are not exhaustive of the web channel operation, such as what can contain and what it can display.

In one embodiment, the look and feel of the web channel is at least in part defined by one or more editors operating content editors 220-222 (e.g., users with the specific permission or editing privilege to modify content as controlled by the web channel engine). The editors are allowed to interact in real-time with the web channel engine 202 by the backend-GUI. An editor is allowed to not only upload/remove/modify content, but also modify the live-tag look and feel and choose the form of the output provided to viewers (video, PDF, page, etc.).

In one embodiment, an editor will be able to control the look and feel of the web channel engine 202, by setting a property that allows it to automatically add frames to pictures, or that allows it to cover/play the original sound track of a video, or to use a specific style/font for text, or to delay/accelerate a sequence.

In one embodiment, a set of pre-defined properties (style) will be made available to editors in order to speed-up the setting process and maximize the final result. Each time an editor chooses to switch from one style to another for the web channel, it will change its look and feel in real-time. In some embodiments, this way to present a web channel (e.g., a web page) will be present among other styles made available.

Figure 5:
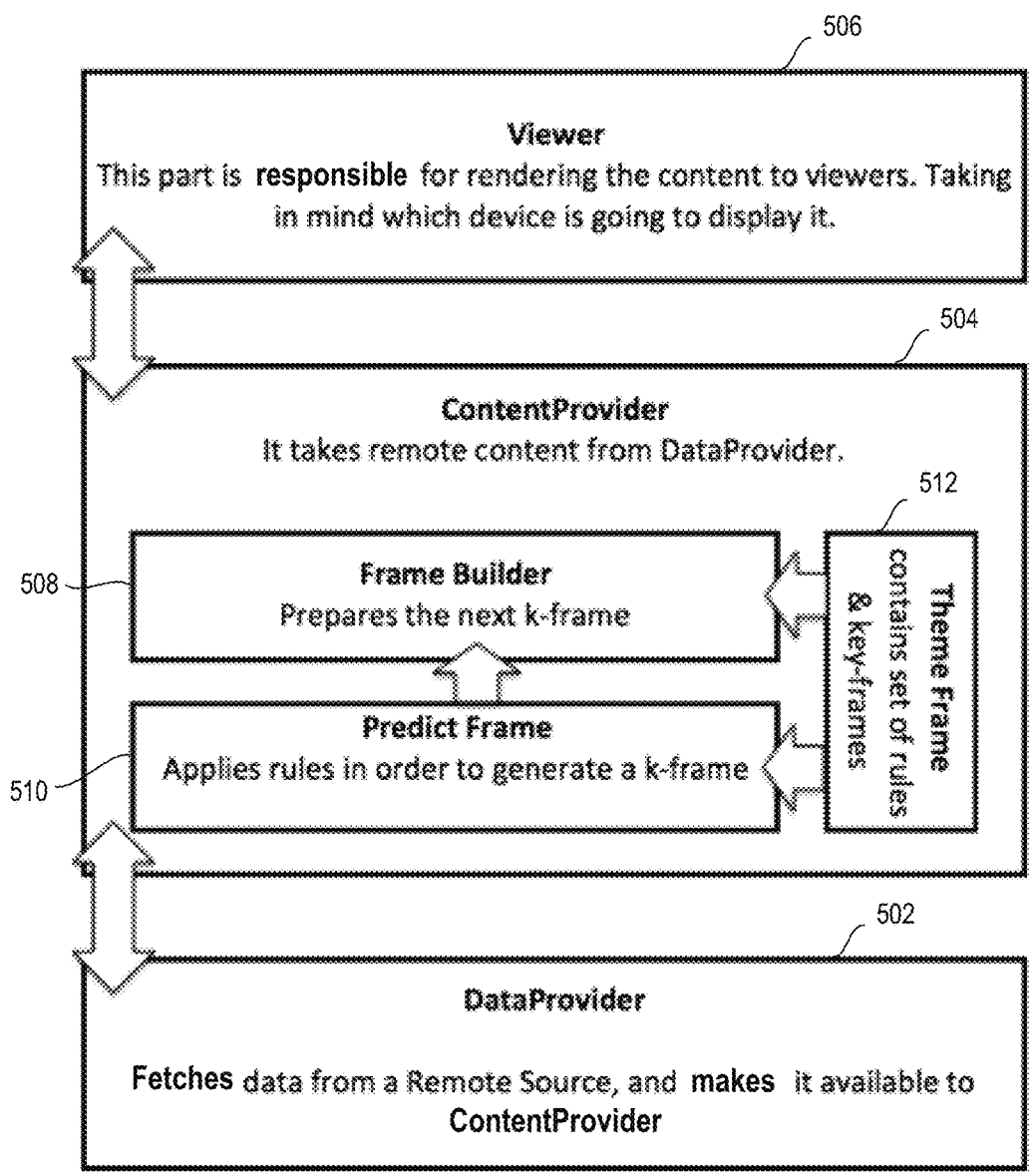
FIG. 5 shows a web channel presenter for presenting content of the web channel to a viewer on the viewer's computing device according to one embodiment.

In one embodiment, the web channel engine 202 is associated with a client-side technology that is responsible for the way contents of the web channel are provided to viewers. FIG. 5 illustrates an architecture of a web channel presenter to present content of the web channel on a viewer's computing device according to one embodiment. In FIG. 5, the web channel presenter includes a content provider 504. The content provider 504 provides content based on data from a general remote source. Content provider 504 is a software component that prepares contents by performing some kind of analysis on a file (e.g., face detection). Content provider 504 also applies effects on the basis of the content it has received (e.g., a photo is translated vertically then zoomed to the face of the subject). In FIG. 5, a data provider 502 is a layer of software that is in charge of fetching the content from the remote source.

Content provider 504 includes a frame builder component 508, a predict frame component 510, and a theme frame component 512, as discussed in more detail below. Theme frame component 512 contains a set of rules and key-frames. A key frame is basically a scene—a succession of frames that are the direct consequence of applying an effect to a photo or a video (e.g., translating and zooming to a face). Predict frame component 510 applies these rules (e.g., if there is a face in this photo, then, apply a zoom effect to it.)

in order to generate a next key-frame for presentation to the viewer. Frame builder component 508 prepares this next key-frame for presentation.

Once content is made available by the content provider 504, a viewer component 506 renders the content for display on a viewer computing device. The web channel presenter can be implemented on devices such as tablet computers, smartphone, smart TV, digital media players, mobile phones, laptop computers, personal computers, etc. The viewer component 506 takes into account the typical, prior usage history of the device and the device form-factor to improve the user experience. The content provider 504 may take into account any information directly or indirectly available from a file that constitutes web channel contents in order to improve the user experience.

In one embodiment, the web channel is provided for viewing by the viewer using the web channel presenter as a real-time stream by modifying content of the web channel on the basis of the audience/viewers/editors interaction, as was discussed above. In various embodiments, the content of the web channel may be modified by web channel engine 202, the web channel presenter, or a combination of both.

In some embodiments, content provider 504 will limit use of information directly available from the files. A single file may be used by several different channels. In one embodiment, a web channel is a set of URLs where content are made available for download to users. A single file can be made available under several URLs, and so it can be used by several different channels. This single file is still a singular resource, and any change to the single file impacts simultaneously on the several channels that constitutes the content (e.g., as based on editors interaction discussed above). The factors considered here by content provider 504 include, for example, file size; file name; time file was uploaded; time file was generated; localization where the file was created (e.g., as a tag-localized photo); information about exposition, timing, etc., when present; number of words/lines a text contains; playback duration; etc.

In some other embodiments, additional properties (e.g., that can be deduced by applying known artificial-intelligence techniques) can be used in addition to the foregoing factors, such as photo layout recognition, video layout recognition, etc. In one example, results of a photo layout recognition include a determination that a photo is a foreground face, a photo is a document, or that a photo is a landscape or a recognized face. Exemplary results of photo layout recognition include a determination that a video is a music-clip video, a video is a sport event video, and/or a video is a professional (movie or a TV show) video, etc.

In one embodiment, other information that can be used in customizing the viewer experience is made available to the system (web channel engine 202) by sources that are independent from the content sourcing. For example, the presentation of the web channel may include the status of the web channel (e.g., a sequence of the documents that has been already presented to the viewer). In one embodiment, the status of a web channel is a complex composition of different elementary statuses: Online/Offline—meaning visible or not; Not-still-viewed/Viewed/In-Progress—meaning maybe having been stopped by a user, so the web channel will restart from this stopping point the next time it is viewed; and Public/Reserved, meaning visible to everyone or to a limited sub-set of users.

For example, the presentation of the web channel may be based on viewer interaction. In some embodiments, viewers are allowed to skip forward and backward on the web channel. This kind of interaction constitutes a source of information to the content provider 504. In some other embodiments, the moment in time that a viewer decides to stop watching a web channel will be taken in consideration. In some other embodiments, the increased number of viewers that viewed the documents of the web channel in a specific sequence is used to increase the probability that the specific sequence will be used again in the future to present the web channel.

For example, the presentation of the web channel may be based on editor interaction. In some embodiments, while up-streaming contents, editors will be monitored in their positioning (e.g., via GPS) and orientation (e.g., via compass/accelerometers) by a dedicated application on their device (e.g. smart phone, a Go-Pro device, a Google Glass device, etc.). If a large number of editors are looking at the same event from different viewpoints (e.g., from different computing devices), the probability that what they're looking at is of interest increases; and thus, the web channel will be enriched by sending live that specific group of streamed contents.

For example, the presentation of the web channel may be based on the mood of viewers. In some embodiments, viewers use a social network identifier (ID) to log in the system. The system may obtain the mood of the viewers via a specific social network API, or via receiving an answer to a question about the current mood of the viewers.

The web channel presentation is changed by a rule engine that is part of theme frame component 512 on the basis of the mood of a viewer. As an example, if the web channel is composed by several sound-tracks or by several-web-radio URLs, or a mixture thereof, it will start to play music that matches the mood of the viewer.

For example, the presentation of the web channel may be based on moods of the editors/viewers. In one embodiment, user devices are configured to monitor heart-beat, skin-conductivity, or other biometric data (e.g., from an Apple Watch device). The user devices are configured to give a measurement or estimation of the editor emotive response while up-streaming the content. Using this information, the system will modify the evolution of the web channel that a viewer is watching by modifying it accordingly to the mood of the viewer.

In one embodiment a web-cam integrated on a device is used to capture information about a viewer (e.g., age, emotions, gender).

In one embodiment, the web channel may include information sources that are from a news event site (e.g., obtainable by an RSS channel). A mass-impact event like a tsunami or the Super Bowl game can potentially be used to improve web channel viewers' experience (audience interaction).

In one embodiment, each of the above information items can be provided as an input to a rules engine included in content provider 504. The content provider 504 uses the rules engine to adapt presentation of web channel content for presentation to the audience currently online.

In one embodiment, the viewer/mass-media interest for a given event (e.g., Christmas Eve) is measured. This information is used to increase the frequency of certain images (e.g., pictures from the same period of the year). At the same time, videos that contain faces of family members will be selected in preference to the videos containing merely contain sea and beach landscapes not associated with a particular viewer. Audio content relevant to the event is selected (e.g., an increased number of feasts-theme audios will be played, etc.).

In some other embodiments, numerous pictures about a given same subject will let the content provider 504 accelerate the clip of the web channel, when that particular subject is met, or let it decide to aggregate certain content more often such as photos compared to other content items containing a more rare subject.

In some other embodiments, having video and photo items from a common same location (or time) permits the content provider 504 to preferentially show them in close sequence, adjusting the timing and duration of that part of the web channel clip to the duration of a certain theme song in the background.

In one embodiment, the set of rules of the rules engine that are the logic by which the content-provider customizes look and feel of the web channel for a viewer is not fixed in time. Rather, the rules change over time. In one example, the rules can change based on learning by machine-learning approaches (e.g., Bayesian learning approaches allows correlation of inputs and outputs, even when no statistical rules are known).

Figure 4:
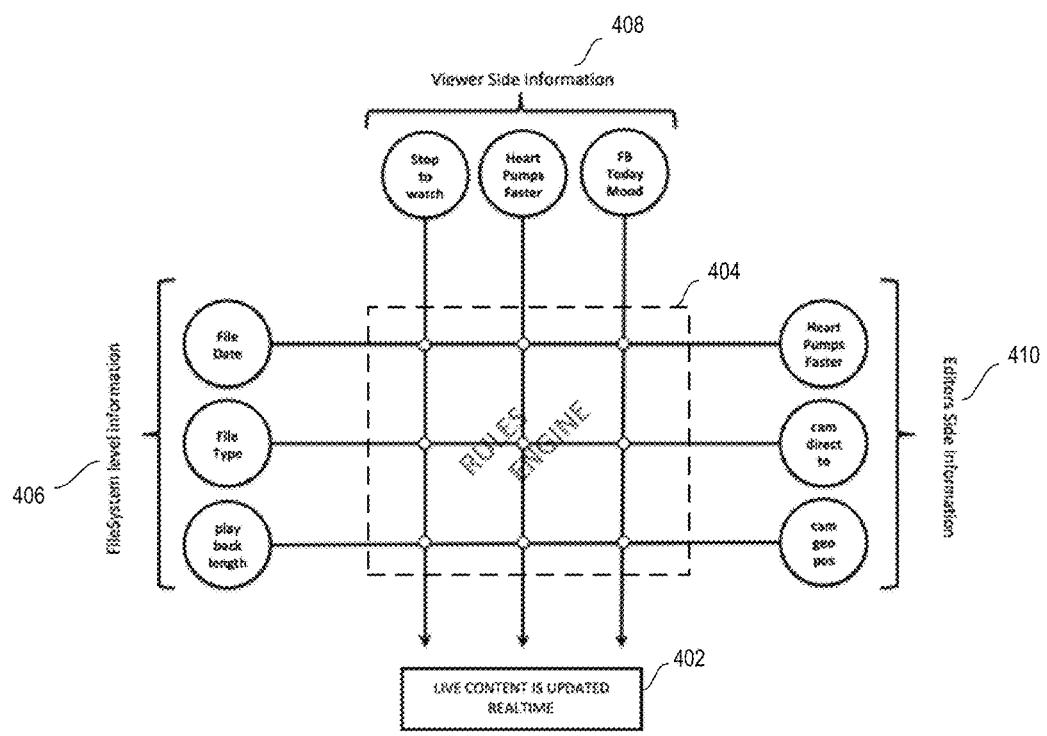
FIG. 4 shows a method to combine information received from different electronic sources for content presentation according to one embodiment.

FIG. 4 shows a method to combine information coming from different sources for content presentation via the web channel according to one embodiment.

In one embodiment, theme-frame component 512 of content provider 504 controls storing of rules and associating the rules to a specific set of the web channel (a theme). For example, a web channel having the theme "retro" will be characterized by a vintage effect applied on photos, old music, and visual effects on videos that make them appear as if being damaged by time or usage.

Once predict frame component 510 has defined the sequence of a clip including, for example, duration of each frame, duration of each sub-sequence, reproduction speed of each sequence, background sounds and effects, scene transaction, etc., the whole sequence can be passed to the frame builder component 508, which assembles the entire content stream and passes it to the viewer component 506.

In one example, some devices are uploading content for streaming to a specific web channel. An infrastructure (a dedicated complex system of devices interconnected with each other) is provided to expose specific web services that allow the up-streaming. The devices are configured to tag each streaming with the specific latitude/longitude and point of view (direction) information. This information is deduced in one embodiment by GPS and compass units in the user devices uploading the streaming.

Information about streaming instant position and direction, coming from different devices, are elaborated by predict frame component 510. Predict frame component 510 has sufficient information to identify the presence of a streaming that comes from the same location, and to evaluate if editors are looking at this same event. The more editors that are looking at the same event, the more frames these editors are uploading that will be passed to the frame builder component 508. The frame builder component 508 will add them to the streaming. In one example, this streaming is a main stream that is proposed to a viewer by default, when the viewer is connected to the URL of the web channel.

In one embodiment, a rules engine 404 inside predict frame component 510 contains a prediction rule.

In one embodiment, the uploaded streams are aggregated by clustering the longitude and latitude of the up-streaming devices. A ray-tracing algorithm is applied from a point in the cluster. If several (e.g., more than a threshold-value) rays meet into a point of interest, one of the streams is randomly chosen from the cluster and is passed to the frame builder component 508.

Once the viewers start watching the web channel, they will start to interact with the web channel. Some of them will stop the presentation, and some others will start to go forward and/or backward. All of this information about the viewer interaction is taken into account by the predict frame component 510 to increase/decrease the probability (e.g., increase a frequency of planned presentation) a specific frame will be displayed again in the future.

In one embodiment, after the viewer is instructed about operating the system, he pilots the content presentation, in full or in part, by his own facial expression (e.g., as detected by a web-cam of his mobile device). The system interprets that he is communicating appreciation when smiling (e.g., as determined by facial gesture recognition techniques), and he can make a sad/serious expression in order to accelerate playing of content he dislikes. In addition, more specific facial-related controls can be implemented, such as looking out of the screen to pause the playing, or looking up to skip contents.

In one embodiment, the system decreases the appreciation (L) of any dropped-by-viewer Frame (F) and increases the appreciation (L) of any more-times-viewed Frame (F). If the appreciation (L) of a frame (F) is above a threshold-value, the frame (F) can be passed to the frame builder component 508; else the frame (F) won't be passed to the frame builder component 508.

In one embodiment, the rules in the predict frame component 510 interact with each other. For example, a rule decides which frame can be forwarded to frame builder component 508—the rule takes into account editors' interest about the events they're living, for example, as determined by data from their computing devices; and the rule filters every single frame, matching frames to the rule for deciding the forwarding of frames, to maximize the interest to viewers.

Using a more sophisticated set of rules (e.g., machine learning and/or rules as illustrated in FIG. 4) will amplify the user experience and provide viewers with the impression that tagged contents are coming to life.

In one embodiment, the interaction between both ends of the media (editors and viewers) trace a difference as compared to current media content providers (web page on TV, internet video games etc.). Content is automatically adjusted and negotiated by interaction between all of the actors it is linked to, even when none is taking care to drive it or direct it. This defines a new approach to media content definition.

In one embodiment, the web browsers 224-226 of FIG. 1 are configured with a web channel presenter, as was discussed above for FIG. 5. The web channel presenter is configured with a rules engine 404 to customize the presentation of the contents linked to the web channel based on not only the presentation configurations of the web channel as specified by the content editor, but also other information associated with the web channel, such as measurements from the sensors attached to the content sources, measurements from the sensors attached to the computing devices of the web browsers of the users viewing the web channel engine, the interaction statistics of the users viewing the web channel engine, and the users editing the web channel engine.

In one embodiment, as illustrated in FIG. 4, file system level information 406, viewer side information 408, and editor side information 410 are used as inputs to rules engine 404. The output from rules engine 404 is updating 402 of live content in real-time. Viewer side information 408 is data regarding interactions obtained from viewers as discussed above (it should be noted that the figures do not illustrate all possible sets of inputs—for example, emotion recognition is not explicitly represented, but could be used in various embodiments). Editor side information 410 is data regarding interactions obtained from editors as was discussed above.

File system level information 406 includes, for example, information such as: dates of access/creation/modify; file type (IMG/VIDEO/MUSIC/OTHERS); play-back length (in case of music/video). File system level information 406 is stored in infrastructure and is accessed by a user's device (e.g., mobile phone, etc.)

In one embodiment, the rules engine 404 is configured to organize and convert the contents associated with the web channel, such as the static content documents, live content streaming from content sources, etc., into a video presentation. Different contents of the web channel are shown in the web channel presenter configured in the web browsers at different times in an automated way, based on the prioritization and customization performed by the rules engine 404.

In one embodiment, the web channel presenter is further configured with a user interface to allow the user to interact with the web channel content to selectively view the contents associated with the web channel. The interaction of one user is stored as part of the interaction statistics which can be used by the rules engine 404 to prioritize and customize the subsequent presentation of the contents to other users. From the user interactions with the contents presented via the web channel, the rules engine 404 is configured to learn and/or deduce the preferences of the users and/or the different preferences of different groups of users, etc., to optimize the presentation scenarios. Thus, although the web browsers may be visiting the web channel concurrently at the same time, the presentation of the contents associated with the web channel is customized for different users based on the interaction histories of respective users interacting with content from the web channel, the sensor measurements, the identities and profiles of the users, etc. The customization is dynamically adjusted in real time based on the interaction history of the users as a whole, and the inputs from the content editors.

In one embodiment, the web channel presenters are configured as widgets or applications running inside web browsers. In other embodiments, the web channel presenters can be configured as dedicated applications running as desktop applications on personal computers, or mobile applications in mobile devices, such as tablet computers, mobile phones, smart phones, digital media players, etc.

Data Processing Implementation

The systems and methods disclosed above are implemented in a computer apparatus in the form of a data processing system.

Figure 6:
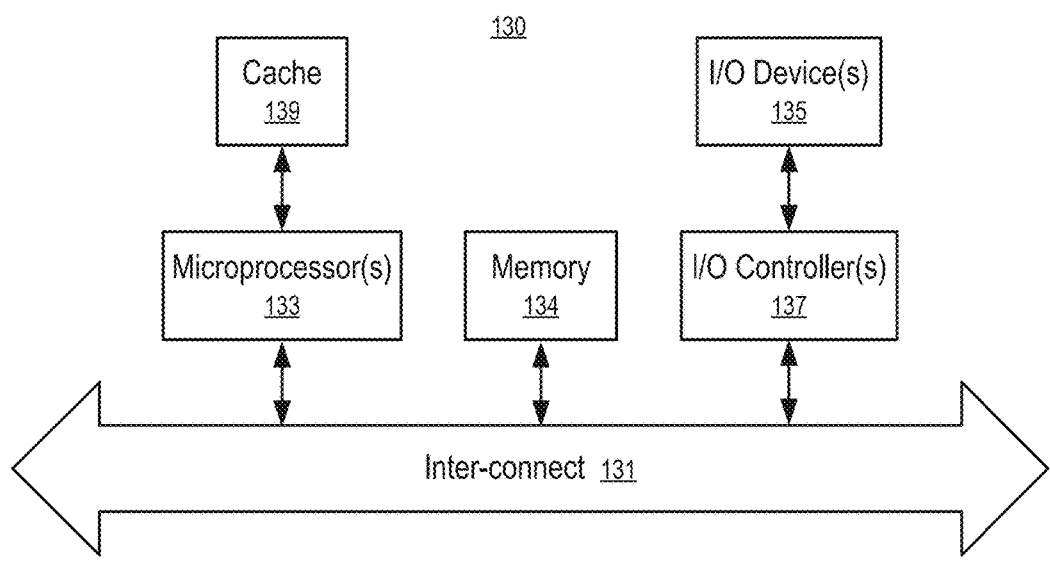
FIG. 6 illustrates a data processing system according to one embodiment.

FIG. 6 illustrates a data processing system according to one embodiment. While FIG. 6 illustrates various components of a computer system, it is not intended to represent any particular architecture or manner of interconnecting the components. One embodiment may use other systems that have fewer or more components than those shown in FIG. 6. The data processing system can be used in some embodiments to implement web server 210, which executes web channel engine 202, or to implement web browsers 224-226, content sources 216-218, and/or content editors 220-222.

In FIG. 6, the data processing system (130) includes an inter-connect (131) (e.g., bus and system core logic), which interconnects one or more microprocessors (133) and memory (134). The microprocessor (133) is coupled to cache memory (139) in the example of FIG. 6.

In one embodiment, the inter-connect (131) interconnects the microprocessor(s) (133) and the memory (134) together and also interconnects them to input/output (I/O) device(s) (135) via I/O controller(s) (137). I/O devices (135) may include a display device and/or peripheral devices, such as mice, keyboards, modems, network interfaces, printers, scanners, video cameras and other devices known in the art. In one embodiment, when the data processing system is a server system, some of the I/O devices (135), such as touch screens, printers, scanners, mice, and/or keyboards, are optional.

In one embodiment, the inter-connect (131) includes one or more buses connected to one another through various bridges, controllers and/or adapters. In one embodiment the I/O controllers (137) include a USB (Universal Serial Bus) adapter for controlling USB peripherals, and/or an IEEE-1394 bus adapter for controlling IEEE-1394 peripherals.

In one embodiment, the memory (134) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (e.g., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

The invention claimed is:

1. A non-transitory computer storage medium storing instructions, which when executed, cause a first computing device of a user to:

communicate, over a network, by the first computing device, with a web location to receive content;

receive, by the first computing device, content components accessed from the web location, wherein the content components comprise a first content component comprising a plurality of frames, the plurality of frames comprising at least a part of a content;

present, by a web channel presenter running on the first computing device, in a first user interface the first content component in a manner determined by a rules engine, running on the first computing device, applying a set of stored rules to interaction data in real-time on the first computing device;

wherein the interaction data comprises data representing real-time interactions of a first user with the first user interface while the first user is viewing the first content component, wherein presenting the first content component comprises selecting a next frame of the plurality of frames and formatting the next frame to apply a desired effect to present to the first user based on the set of stored rules in the rules engine and the interaction data;

cause the web channel presenter, running on a second computing device, in a second user interface, to present the content components in the second user interface in the manner determined by the rules engine running on the first computing device without interaction by the first user, wherein presenting the first content component to the second user interface comprises formatting the next frame of the plurality of frames to apply the same desired effect to present to the second user based on the interaction data of real-time interactions of the first user with the first user interface while the second user views the content; and cause the web channel presenter running on the first computing device, after formatting the next frame of the plurality of frames to apply the same desired effect to present to the first user, to dynamically change the next frame in accordance with an updated desired effect.

2. The non-transitory computer storage medium of claim 1, wherein the instructions further cause the first computing device to receive, over the network, data regarding interactions of users other than the first and second users.

3. The non-transitory computer storage medium of claim 1, wherein the content components are determined based on presentation configuration data provided from content editors.

4. The non-transitory computer storage medium of claim 1, wherein the content components comprise streaming data obtained from a content source.

5. The non-transitory computer storage medium of claim 1, wherein the selecting the next frame is further based on layout recognition of frames previously presented to the first user.

6. The non-transitory computer storage medium of claim 1, wherein the interaction data further comprises historical interaction data, stored on the first computing device, comprising previous interactions between the first user and the first user interface.

7. The non-transitory computer storage medium of claim 1, which when executed, further cause the first computing device of the first user to determine a priority of interest of the content components based on the interaction data.

8. The non-transitory computer storage medium of claim 1, wherein the real-time interaction data is based on sensor data received by the first computing device.

9. The non-transitory computer storage medium of claim 8, wherein the sensor data includes at least one of location, physical orientation in space of the first computing device, heart-beat, skin-conductivity, facial expression, and biometric data.

10. The non-transitory computer storage medium of claim 8, wherein the sensor data comprises video frames captured by a camera.

11. A method comprising:
communicating, over a network, by a first computing device, with a web location to receive content;
receiving, by the first computing device, content components accessed from the web location, wherein the content components comprise a first content component comprising a plurality of frames, the plurality of frames comprising at least a part of a content;
presenting, by a web channel presenter running on the first computing device, in a first user interface the first content component in a manner determined by a rules engine, running on the first computing device, applying a set of stored rules to interaction data in real-time on the first computing device;
wherein the interaction data comprises data representing real-time interactions of a first user with the first user interface while the first user is viewing the first content component,
wherein presenting the first content component comprises selecting a next frame of the plurality of frames and formatting the next frame to apply a desired effect to present to the first user based on the set of stored rules in the rules engine and the interaction data;
cause the web channel presenter, running on a second computing device, in a second user interface, to present the content components in the second user interface in the manner determined by the rules engine running on the first computing device without interaction by the first user, wherein presenting the first content component to the second user interface comprises formatting the next frame of the plurality of frames to apply the same desired effect to present to the second user based on the interaction data of real-time interactions of the first user with the first user interface while the second user views the content; and
cause the web channel presenter running on the first computing device, after formatting the next frame of the plurality of frames to apply the same desired effect to present to the first user, to dynamically change the next frame in accordance with an updated desired effect.

12. The method of claim 11, wherein the content components are determined based on presentation configuration data provided from content editors.

13. The method of claim 11, wherein the content components comprise streaming data obtained from a content source.

14. The method of claim 11, wherein the selecting the next frame is further based on layout recognition of frames previously presented to the first user.

15. The method of claim 11, wherein the interaction data further comprises historical interaction data, stored on the first computing device, comprising previous interactions between the first user and the first user interface.

16. The method of claim 11, further comprising determining, by the first computing device, a priority of interest of the content components based on the interaction data.

17. The method of claim 11, wherein the real-time interaction data is based on sensor data received by the first computing device.

18. The method of claim 17, wherein the sensor data includes at least one of location, physical orientation in space of the first computing device, heart-beat, skin-conductivity, facial expression, and biometric data.

19. The method of claim 17, wherein the sensor data comprises video frames captured by a camera.

20. The non-transitory computer storage medium of claim 1, wherein the next frame that is dynamically changed in accordance with the updated desired effect is to match a current mood of the first user based on an estimation of a first user response to content from a second content component.

21. The non-transitory computer storage medium of claim 1, wherein the first content component is web content.

22. The non-transitory computer storage medium of claim 1, wherein the updated desired effect is initiated through the second user interface and provided by the web channel presenter running on the second computing device to the first user interface.

23. The method of claim 11, wherein the next frame that is dynamically changed in accordance with the updated desired effect is to match a current mood of the first user based on an estimation of a first user response to content from a second content component.

24. The method of claim 11, wherein the first content component is web content.

25. The method of claim 11, wherein the updated desired effect is initiated through the second user interface and provided by the web channel presenter running on the second computing device to the first user interface.

* * * * *